(12) United States Patent
Suzuki et al.

(10) Patent No.: US 11,333,509 B2
(45) Date of Patent: May 17, 2022

(54) INFORMATION PROCESSING SYSTEM AND SERVER

(71) Applicant: Toyota Jidosha Kabushiki Kaisha, Toyota (JP)

(72) Inventors: Koichi Suzuki, Miyoshi (JP); Katsunori Takami, Tachikawa (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 695 days.

(21) Appl. No.: 16/299,325

(22) Filed: Mar. 12, 2019

(65) Prior Publication Data

US 2019/0285423 A1 Sep. 19, 2019

(30) Foreign Application Priority Data

Mar. 14, 2018 (JP) .............................. JP2018-046773

(51) Int. Cl.
*G01C 21/34* (2006.01)

(52) U.S. Cl.
CPC .............................. *G01C 21/3423* (2013.01)

(58) Field of Classification Search
CPC .... G01C 21/3423; G01S 19/42; G06Q 10/02; G06Q 30/0639; G06Q 30/0645
See application file for complete search history.

(56) References Cited

U.S. PATENT DOCUMENTS

| 2002/0026281 | A1* | 2/2002 | Shibata | ................. G08G 1/205 701/29.1 |
| 2004/0193440 | A1 | 9/2004 | Mawatari | |
| 2012/0084001 | A1* | 4/2012 | Suzuki | ............... G01C 21/3423 701/430 |
| 2015/0047947 | A1* | 2/2015 | Tait | ......................... B60L 53/30 198/339.1 |
| 2016/0265923 | A1* | 9/2016 | Fukushima | ............ G08G 1/207 |
| 2017/0185991 | A1* | 6/2017 | Park | ..................... H04W 4/023 |
| 2018/0018635 | A1 | 1/2018 | Suzuki | |
| 2018/0136655 | A1* | 5/2018 | Kim | ..................... G05D 1/0011 |

FOREIGN PATENT DOCUMENTS

| JP | 2002-083393 A | 3/2002 |
| JP | 2002-229995 A | 8/2002 |
| JP | 2004-295392 A | 10/2004 |
| JP | 2005-308460 A | 11/2005 |
| JP | 2011-258069 A | 12/2011 |
| JP | 2013-257774 A | 12/2013 |
| JP | 2014-089153 A | 5/2014 |
| JP | 2018-009904 A | 1/2018 |

* cited by examiner

*Primary Examiner* — Behrang Badii
(74) *Attorney, Agent, or Firm* — Dinsmore & Shohl LLP (57) ABSTRACT

An information processing system acquires positional information of a vehicle, acquires positional information of a terminal device, estimates current transportation means of a user based on the positional information of the terminal device, decides information relating to a first route, along which the user moves to the vehicle, based on the positional information of the terminal device, the estimated current transportation means of the user, and the positional information of the vehicle, decides information relating to a second route, along which the user who has moved to the vehicle moves to a destination using the vehicle, based on a first predicted arrival time, the positional information of the vehicle, and positional information of the destination, and outputs first guide information for prompting the user to start moving along the first route in a form of a video or a sound.

6 Claims, 8 Drawing Sheets

| IDENTIFICATION INFORMATION OF USER | POSITIONAL INFORMATION OF TERMINAL DEVICE | | IDENTIFICATION INFORMATION OF VEHICLE | POSITIONAL INFORMATION OF VEHICLE | | POSITIONAL INFORMATION OF DESTINATION | FIRST TARGET TIME | SECOND TARGET TIME |
|---|---|---|---|---|---|---|---|---|
| | TIME | LATITUDE AND LONGITUDE | | TIME | LATITUDE AND LONGITUDE | | | |
| U1 | : | */* | V1 | : | */* | */* | 17:00 | 16:00 |
| | : | */* | | : | */* | | | |
| | ... | ... | | ... | ... | | | |

INFORMATION PROCESSING SYSTEM AND SERVER

CROSS-REFERENCE TO RELATED APPLICATION

This application claims priority to Japanese Patent Application No. 2018-046773 filed on Mar. 14, 2018, incorporated herein by reference in its entirety.

BACKGROUND

1. Technical Field

The present disclosure relates to an information processing system and a server.

2. Description of Related Art

In the related art, a user support technique relating to a traveling schedule of a vehicle is known. For example, Japanese Unexamined Patent Application Publication No. 2005-308460 (JP 2005-308460 A) discloses a navigation device that calculates a needed time from a current position of a vehicle rented to a user to a return location and outputs a notification indicating that the user seems to arrive late at the return location, to a device mounted in the vehicle, a mobile phone carried with the user, or the like. Japanese Unexamined Patent Application Publication No. 2002-083393 (JP 2002-083393 A) discloses a schedule management system that, when an action start time traced back from a departure time to a next visit destination by a preparation time optionally set by a user is reached, gives a notification to a mobile phone carried with the user. Japanese Unexamined Patent Application Publication No. 2002-229995 (JP 2002-229995 A) discloses a multi-modal seamless information providing device that estimates a state indicating whether a user is a pedestrian, a passenger, or a driver in consideration of the type of a terminal of the user and a moving speed of the user and searches for a route and provides route information in compliance with an information search rule and an information processing rule according to the estimated state. Japanese Unexamined Patent Application Publication No. 2011-258069 (JP 2011-258069 A) discloses a vehicle reservation system that, when determination is made that a user is unable to arrive at a rent location until a rent start time of a vehicle based on positional information of a portable information terminal of the user, transmits a reservation change recommendation to the portable information terminal.

SUMMARY

A service, such as car rental and car sharing, in which a user rents and uses a vehicle is known. A use mode (hereinafter, referred to as a "park-and-ride system") of a vehicle in which a user moves using a vehicle, and then, further moves using other transportation means, such as a bus or a train, has spread. For example, when a rented vehicle is used in the park-and-ride system, in returning the vehicle, the user needs to first move to the parked vehicle using any transportation means, and then, to further move to a predetermined return location using the vehicle. As in the example, in the park-and-ride system where the parked vehicle and the user may be comparatively distant from each other, when a user support technique relating to a traveling schedule of the vehicle is about to be used, convenience in the related art is not always high. For example, the needed time for which the user moves to the parked vehicle may dynamically change according to an action of the user. For this reason, for example, even though notification is given to the user based on the needed time for moving to a predetermined destination, such as a return location of the rented vehicle, using the vehicle, there is a possibility that the user is unable to arrive at the predetermined destination using the vehicle until a target time, such as a return time of the rented vehicle, depending on the needed time for which the user moves to the parked vehicle.

The disclosure provides an information processing system and a server capable of improving convenience of a user support technique relating to a traveling schedule of a vehicle.

A first aspect of the disclosure relates to an information processing system. The information processing system includes a vehicle and a terminal device which are to be used by a user, and a server configured to be able to perform communication with the vehicle and the terminal device. The vehicle is configured to acquire positional information of the vehicle. The terminal device is configured to acquire positional information of the terminal device. The terminal device or the server estimates current transportation means of the user based on the positional information of the terminal device. The server decides information relating to a first route, along which the user moves to the vehicle, based on the positional information of the terminal device, the estimated current transportation means of the user, and the positional information of the vehicle. The server decides information relating to a second route, along which the user who has moved to the vehicle moves to a predetermined destination using the vehicle, based on a first predicted arrival time at which the user arrives at the vehicle along the first route, the positional information of the vehicle, and positional information of the predetermined destination. The server transmits first guide information for prompting the user to start moving along the first route to the terminal device based on comparison of a second predicted arrival time, at which the user arrives at the predetermined destination along the second route, with a predetermined time. When the first guide information is received, the terminal device outputs the first guide information in a form of video or sound.

In the information processing system according to the first aspect, the first guide information may include the information relating to the first route.

In the information processing system according to the first aspect, the server may decide the information relating to the first route such that initial transportation means among one or more transportation means included in the information relating to the first route becomes the estimated current transportation means of the user.

In the information processing system according to the first aspect, the server may estimate the current transportation means of the user based on the positional information of the terminal device and sensor information of a sensor unit mounted in the terminal device.

In the information processing system according to the first aspect, when the estimated current transportation means of the user is not the vehicle, the server may transmit the first guide information to the terminal device based on comparison of the second predicted arrival time with the predetermined time. When the estimated current transportation means of the user is the vehicle, the server may transmit second guide information for prompting the user to start moving along the second route to the vehicle based on comparison of the second predicted arrival time with the predetermined time. When the second guide information is received, the vehicle may output the second guide information in a form of a video or a sound.

A second aspect of the disclosure relates to a server. The server includes a server communication unit configured to be able to perform communication with a vehicle and a terminal device which are to be used by a user, and a server controller. The server controller receives positional information of the vehicle and positional information of the terminal device through the server communication unit, and decides information relating to a first route, along which the user moves to the vehicle, based on the positional information of the terminal device, current transportation means of the user estimated based on the positional information of the terminal device, and the positional information of the vehicle. The server controller decides information relating to a second route, along which the user who has moved to the vehicle moves to a predetermined destination using the vehicle, based on a first predicted arrival time at which the user arrives at the vehicle along the first route, the positional information of the vehicle, and positional information of the predetermined destination. The server controller transmits guide information for prompting the user to start moving along the first route to the terminal device based on comparison of a second predicted arrival time, at which the user arrives at the predetermined destination along the second route, with a predetermined time.

With the information processing system and the server according to the aspects of the disclosure, convenience of a user support technique relating to a traveling schedule of a vehicle is improved.

BRIEF DESCRIPTION OF THE DRAWINGS

Features, advantages, and technical and industrial significance of exemplary embodiments will be described below with reference to the accompanying drawings, in which like numerals denote like elements, and wherein.

DETAILED DESCRIPTION

Figure 1:
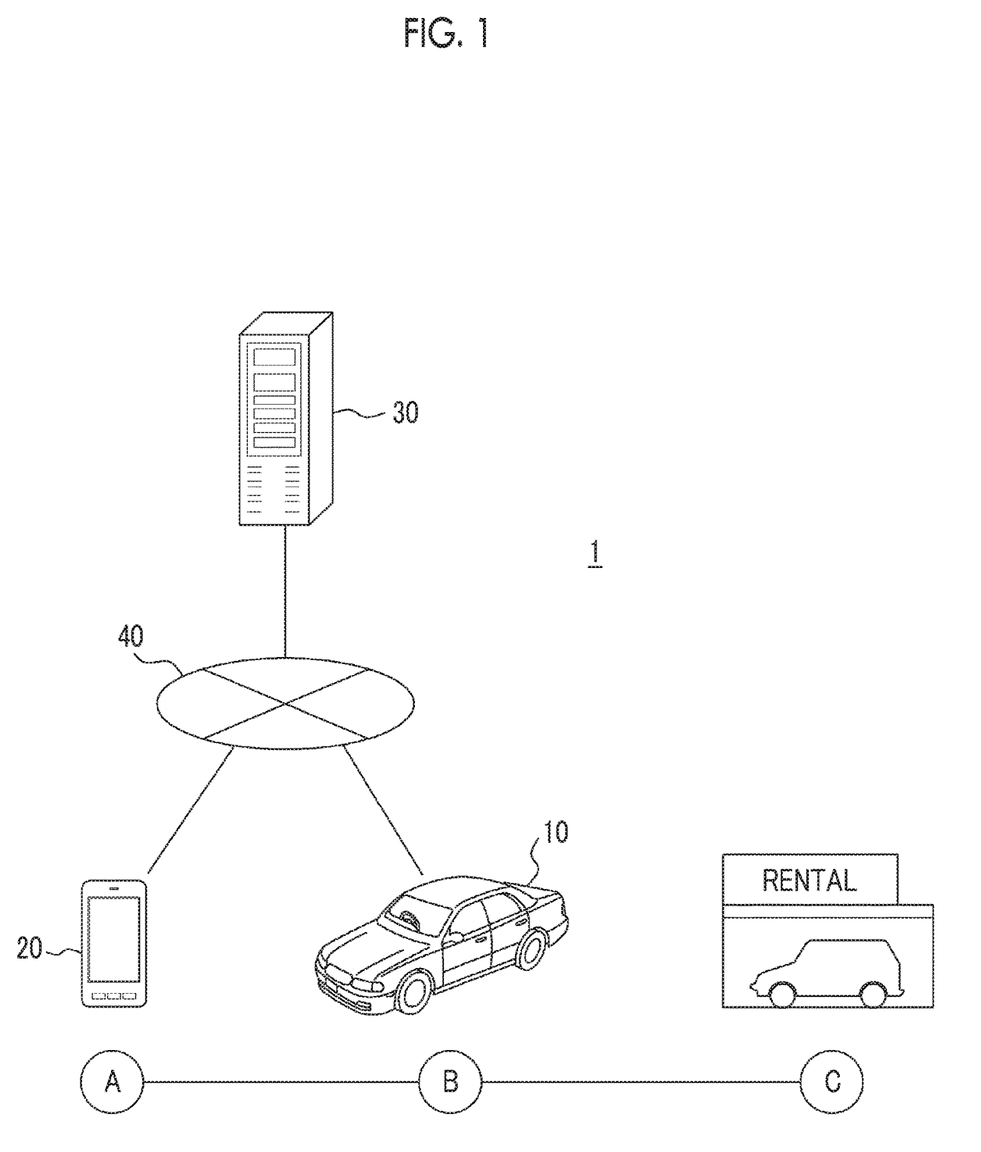
FIG. 1 is a diagram showing the schematic configuration of an information processing system according to an embodiment.

Hereinafter, an embodiment will be described.
Configuration of Information Processing System The outline of an information processing system 1 according to an embodiment will be described referring to FIG. 1. The information processing system 1 includes one or more vehicles 10, one or more terminal devices 20, and a server 30. In FIG. 1, for simplification of description, one vehicle 10 and one terminal device 20 are shown; however, the number of vehicles 10 and the number of terminal devices 20 in the information processing system 1 may be defined optionally. The vehicle 10, the terminal device 20, and the server 30 are connected to, for example, a network 40, such as the Internet.

The vehicle 10 is, for example, an automobile, but is not limited thereto. Any vehicle in which a person can get in may be applied. The terminal device 20 is, for example, a general-purpose mobile terminal, such as a smartphone or a tablet terminal, but is not limited thereto. For example, any mobile terminal, such as a device dedicated for the information processing system 1, may be applied. The terminal device 20 is carried with the user. The server 30 includes one server device or a plurality of server devices being able to perform communication with one another. In the embodiment, for simplification of description, description will be provided assuming that the server 30 includes one server device.

For example, the user of the terminal device 20 may use the vehicle 10 rented from a service provider of car rental or car sharing in a park-and-ride system. Specifically, the user may move using the vehicle 10, and then, may further move using other transportation means, such as a bus or a train, in a state of carrying the terminal device 20. In returning the vehicle 10, the user needs to move to the parked vehicle 10 using any transportation means, and then, needs to move to a predetermined destination (for example, a return location designated from the service provider) using the vehicle 10 until a predetermined time (for example, a return time designated from the service provider). In the example shown in FIG. 1, the user who carries the terminal device 20 is positioned at a point A, the parked vehicle 10 is positioned at a point B, and a destination as a return location is positioned at a point C.

In the information processing system 1 according to the embodiment, the vehicle 10, the terminal device 20, and the server 30 cooperate and user support relating to a traveling schedule of the vehicle 10 is executed. As the outline, the information processing system 1 estimates current transportation means of the user based on information acquired by the terminal device 20 as described below. The information processing system 1 decides a route (hereinafter, referred to as a "first route") for moving from the point A where the user is positioned to the point B where the parked vehicle 10 is positioned through multi-modal route search. The first route to be decided through multi-modal route search includes one or more transportation means. In other words, the first route using one or more transportation means is decided through multi-modal route search.

Here, the first route is decided such that initial transportation means among one or more transportation means included in information relating to the first route becomes the current transportation means of the user estimated described above. Accordingly, for example, when the current transportation means of the user is estimated to be "walk", the first route with the transportation means at the time of departure at the point A to be "walk" is decided. Alternatively, when the current transportation means of the user is estimated to be "bus", the first route having the transportation means at the time of departure at the point A to be "bus" is decided.

The information processing system 1 decides a route (hereinafter, referred to as a "second route") along which the user moves from the point B to the point C where the destination is positioned using the vehicle 10 through vehicle route search. When a predicted arrival time when the user arrives at the point C after moving along the first route and the second route is after a second target time traced back from a first target time (for example, a time as a return time limit of the vehicle 10) by a predetermined extension time, the information processing system 1 outputs information (hereinafter, referred to as "first guide information") for prompting the user to start moving along the first route on the terminal device 20 in a form of a video or a sound.

In this way, with the information processing system 1, the first guide information for prompting the user to start moving along the first route is output on the terminal device 20 in a form of a video or a sound. For this reason, a probability that the user can arrive at the destination using the vehicle 10 until the first target time is improved. The first route is decided based on the current transportation means of the user as described above. For this reason, for example, an inappropriate first route having the initial transportation means to be transportation means other than "bus" is decided even though the user is moving using a bus, and as a result, a probability that the accuracy of the predicted arrival time is degraded is reduced. In other words, since an appropriate first route is decided according to the current transportation means of the user, accuracy of the predicted arrival time is improved, and as a result, a probability that the user can arrive at the destination using the vehicle 10 until the first target time is further improved. Therefore, convenience of a user support technique relating to a traveling schedule of the vehicle 10 is improved.

Next, each configuration of the information processing system 1 will be described in detail.

Configuration of Vehicle

Figure 2:
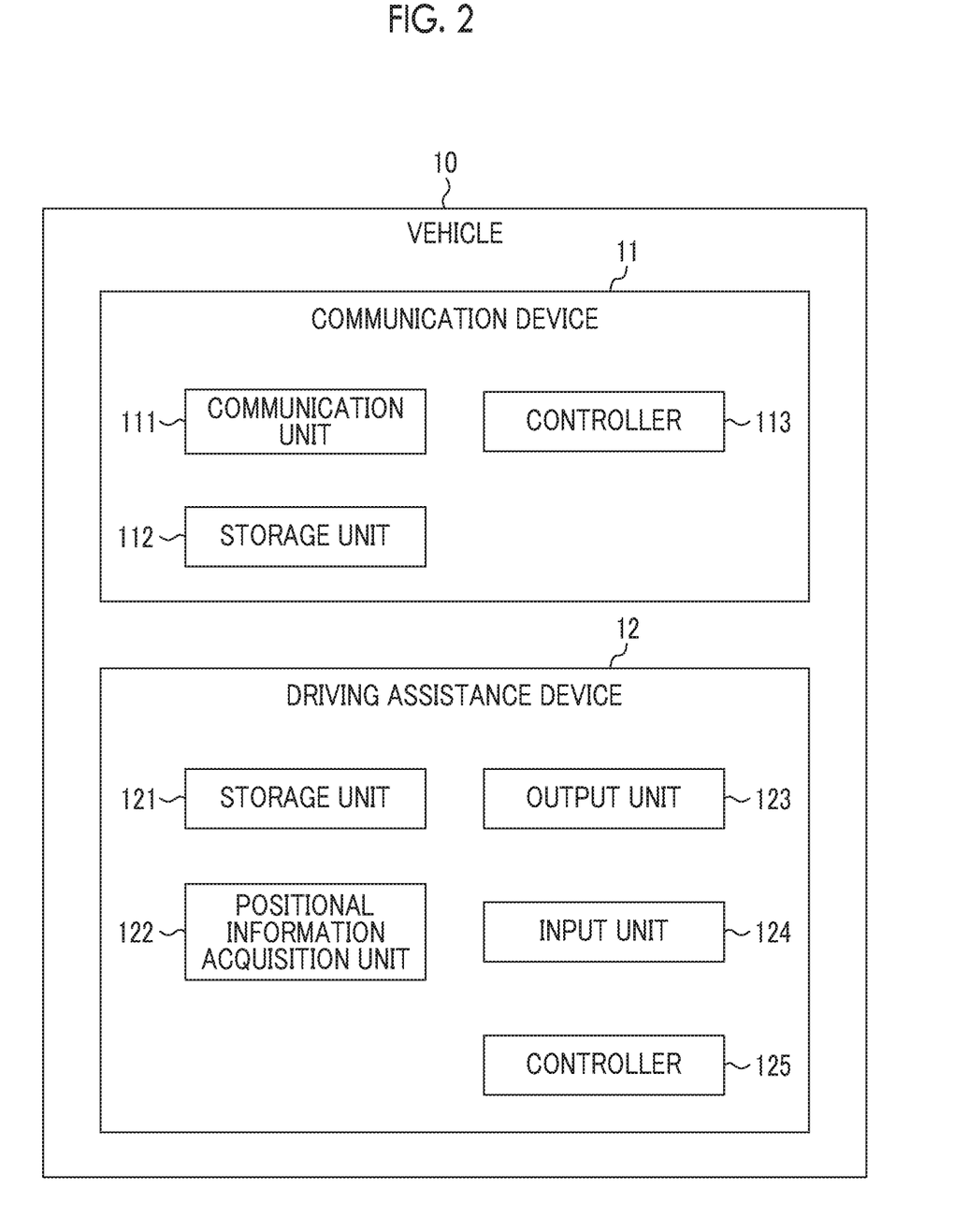
FIG. 2 is a block diagram showing the schematic configuration of a vehicle.

As shown in FIG. 2, the vehicle 10 includes a communication device 11 and a driving assistance device 12. The communication device 11 and the driving assistance device 12 are connected to be communicable with the vehicle 10 through, for example, an in-vehicle network, such as a controller area network (CAN), or a dedicated line.

The communication device 11 may be, for example, an in-vehicle communication device, such as a data communication module (DCM). Specifically, the communication device 11 includes a communication unit 111, a storage unit 112, and a controller 113.

The communication unit 111 includes a communication module that is connected to the network 40. For example, the communication unit 111 may include a communication module corresponding to a mobile communication standard, such as 4th generation (4G). In the embodiment, the communication device 11 is connected to the network 40 through the communication unit 111.

The storage unit 112 includes one or more memories. In the embodiment, the "memory" is, for example, a semiconductor memory, a magnetic memory, an optical memory, or the like, but is not limited thereto. Each memory included in the storage unit 112 may function as, for example, a main storage device, an auxiliary storage device, or a cache memory. The storage unit 112 stores optional information that is used for the operation of the communication device 11. For example, the storage unit 112 may store a system program, an application program, identification information of the vehicle 10, and the like. Here, identification information of the communication device 11 or the driving assistance device 12 in the vehicle 10 may be used as the identification information of the vehicle 10. Information stored in the storage unit 112 may be updated with, for example, information to be acquired from the network 40 through the communication unit 111.

The controller 113 includes one or more processors. In the embodiment, the "processor" is a general-purpose processor or a dedicated processor specific to specific processing, but is not limited thereto. The controller 113 controls the overall operation of the communication device 11.

The driving assistance device 12 is a device that executes driving assistance of the vehicle 10. The driving assistance is, for example, route guidance or autonomous driving to a destination, but is not limited thereto. Autonomous driving includes, for example, levels 1 to 5 defined by the Society of Automotive Engineers (SAE); however, the disclosure is not limited thereto, and the levels may be defined optionally. The driving assistance device 12 may be, for example, a navigation device that executes route guidance or a control device that executes autonomous driving. The driving assistance may be executed by cooperation the driving assistance device 12 and an electronic control unit (ECU) of the vehicle 10, for example. Specifically, the driving assistance device 12 includes a storage unit 121, a positional information acquisition unit 122, an output unit 123, an input unit 124, and a controller 125.

The storage unit 121 includes one or more memories. Each memory included in the storage unit 121 may function as, for example, a main storage device, an auxiliary storage device, or a cache memory. The storage unit 121 stores optional information that is used for the operation of the driving assistance device 12. For example, the storage unit 121 may store a system program, an application program, map information, traffic information (congestion information, traffic volume information, and weather information), and the like. Information stored in the storage unit 121 may be updated with, for example, information to be acquired from the network 40 through the communication device 11.

The positional information acquisition unit 122 includes one or more receivers corresponding to any satellite positioning system. For example, the positional information acquisition unit 122 may include a global positioning system (GPS) receiver. The positional information acquisition unit 122 acquires positional information of the vehicle 10 in which the driving assistance device 12 is mounted.

The output unit 123 includes one or more output interfaces that output information to the user. For example, the output interfaces included in the output unit 123 are a display that outputs information in a form of a video, a speaker that outputs information in a form of a sound, and the like, but are not limited thereto. For example, the display is a panel display, a head-up display, or the like, but is not limited thereto. In the embodiment, "video" may include text, a still image, and a moving image.

The input unit 124 includes one or more input interfaces that detect a user input. For example, the input interfaces included in the input unit 124 are physical keys, capacitance type keys, a touch screen provided integrally with the panel display of the output unit 123, a microphone that receives sound input, and the like, but are not limited thereto.

The controller 125 includes one or more processors. The controller 125 controls the overall operation of the driving assistance device 12.

For example, the controller 125 notifies the server 30 of the identification information of the vehicle 10 and the positional information of the vehicle 10 through the communication device 11. Here, the notification to the server 30 may be performed at any timing. For example, the controller 125 performs the notification to the server 30, for example, each time the vehicle 10 is brought into a specific state (for example, a parked state, a state in which an occupant gets off the vehicle, or the like).

When the user gets in the vehicle 10, the controller 125 notifies the server 30 of getting-in of the user through the communication device 11. The controller 125 receives second guide information for prompting the user to start moving along the second route transmitted from the server 30 according to the notification of getting-in of the user as described below. The second guide information includes information relating to the second route described below, and may further include, for example, optional information, such as a message for prompting the user to start moving and a message for requesting the user to permit the execution of the driving assistance. The controller 125 outputs the second guide information in a form of a video or a sound and waits for a user input to permit the execution of the driving assistance. When the user input is detected, the controller 125 executes driving assistance to move to the destination along the second route. For example, as shown in FIG. 1, route guidance or autonomous driving with the point B where the parked vehicle 10 is positioned as a departure place and the point C where a return location of the vehicle 10 is positioned as a destination is executed.

Here, the second route may include one or more via-points. In such a case, the controller 125 executes driving assistance to move to the destination by way of the one or more via-points along the second route. The via-points may be optionally set by the user, for example. Alternatively, the via-points may be automatically set according to positional information of the destination. For example, a fuel station, a charging station, or the like that exists in the periphery of the destination as the return location of the vehicle 10 and the user should stop over before returning the vehicle 10 may be automatically set as the via-points.

Configuration of Terminal Device

Figure 3:
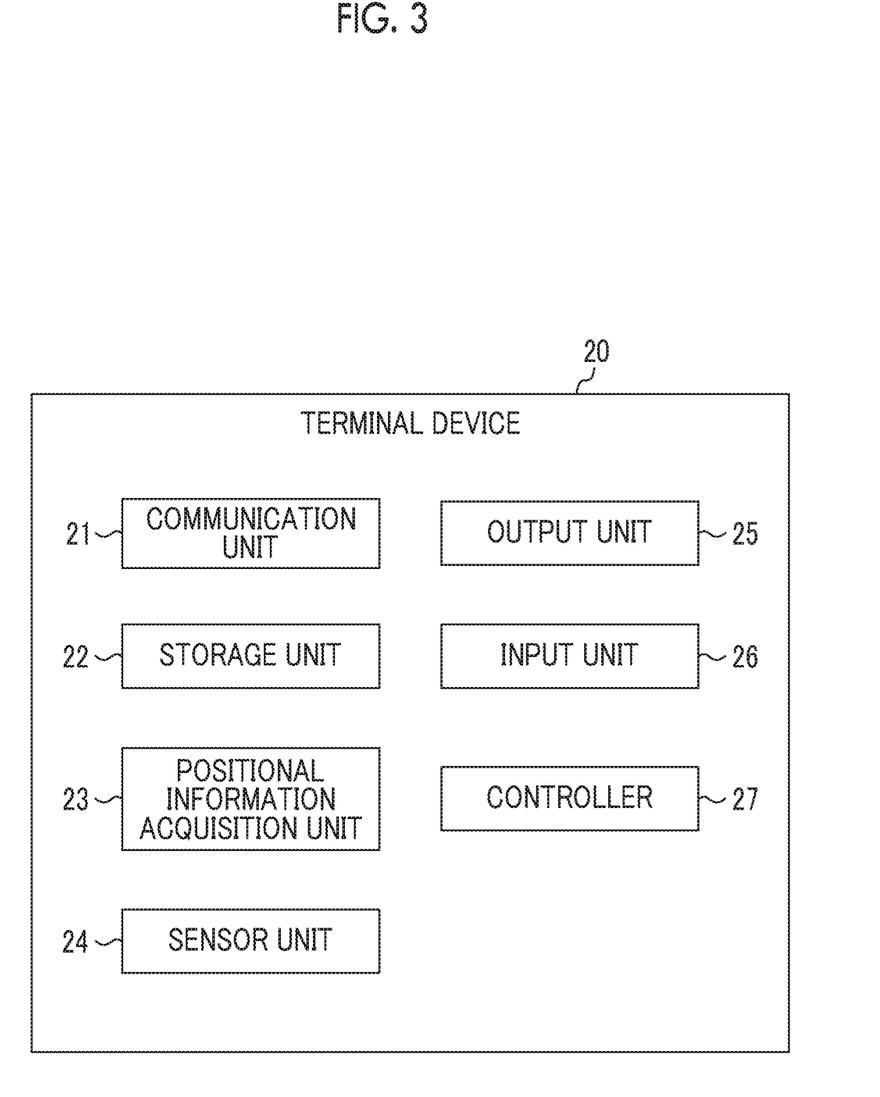
FIG. 3 is a block diagram showing the schematic configuration of a terminal device.

As shown in FIG. 3, the terminal device 20 includes a communication unit 21, a storage unit 22, a positional information acquisition unit 23, a sensor unit 24, an output unit 25, an input unit 26, and a controller 27.

The communication unit 21 includes a communication module that is connected to the network 40. For example, the communication unit 21 may include a communication module corresponding to a mobile communication standard, such as 4G. In the embodiment, the terminal device 20 is connected to the network 40 through the communication unit 21.

The storage unit 22 includes one or more memories. Each memory included in the storage unit 22 may function as, for example, a main storage device, an auxiliary storage device, or a cache memory. The storage unit 22 stores optional information that is used for the operation of the terminal device 20. For example, the storage unit 22 may store a system program, an application program, identification information of the terminal device 20, identification information of the user, and the like. Information stored in the storage unit 22 may be updated with, for example, information to be acquired from the network 40 through the communication unit 21.

The positional information acquisition unit 23 includes one or more receiver corresponding to any satellite positioning system. For example, the positional information acquisition unit 23 may include a GPS receiver. The positional information acquisition unit 23 acquires positional information of the terminal device 20.

The sensor unit 24 includes one or more sensors that detect information relating to the operation or surrounding environment of the terminal device 20. For example, the sensor unit 24 may include an acceleration sensor, an angular velocity sensor, a magnetic sensor, an air pressure sensor, and the like. However, the sensor unit 24 is not limited thereto, and may include any sensors, such as an illuminance sensor, a temperature sensor, and an image sensor (camera). The sensor unit 24 acquires information detected by each sensor as sensor information. For example, the sensor information of the sensor unit 24 may include an acceleration and an angular velocity of the terminal device 20, a magnetic field and air pressure around the terminal device 20, and the like.

The output unit 25 includes one or more output interfaces that output information to the user. For example, the output interfaces included in the output unit 25 are a panel display that outputs information in a form of a video, a speaker that outputs information in a form of a sound, and the like, but are not limited thereto.

The input unit 26 includes one or more input interfaces that detect a user input. For example, the input interfaces included in the input unit 26 are physical keys, capacitance type keys, a touch screen provided integrally with the panel display of the output unit 25, a microphone that receives sound input, and the like, but are not limited thereto.

The controller 27 includes one or more processors. The controller 27 controls the overall operation of the terminal device 20.

For example, the controller 27 stores the positional information of the terminal device 20 acquired by the positional information acquisition unit 23 and the sensor information acquired by the sensor unit 24 in the storage unit 22. The controller 27 notifies the server 30 of the identification information of the user, and the positional information and the sensor information of the terminal device 20 stored in the storage unit 22 through the communication unit 21. Here, the notification to the server 30 may be performed at any timing. For example, the controller 27 performs the notification to the server 30 at a predetermined time interval or each time the terminal device 20 is brought into a specific state. The controller 27 may erase the positional information and the sensor information of the terminal device 20 notified to the server 30 from the storage unit 22.

As described below, when the first guide information for prompting the user to start moving along the first route is received from the server 30, the controller 27 outputs the first guide information through the output unit 25 in a form of a video or a sound. The first guide information includes information relating to the first route, but may further include, for example, optional information, such as information relating to the second route, a message for prompting to start moving, and a message for requesting the user to permit the execution of the route guidance along the first route. Details of information relating to the first route and information relating to the second route will be described below. The controller 27 may wait for a user input to permit the execution of the route guidance along the first route. When the user input is detected, the controller 27 executes route guidance to move to the vehicle 10 along the first route. For example, as shown in FIG. 1, route guidance with the point A where the user is positioned as a departure place and the point 8 where the vehicle 10 is positioned as a destination is executed.

Configuration of Server

Figure 4:
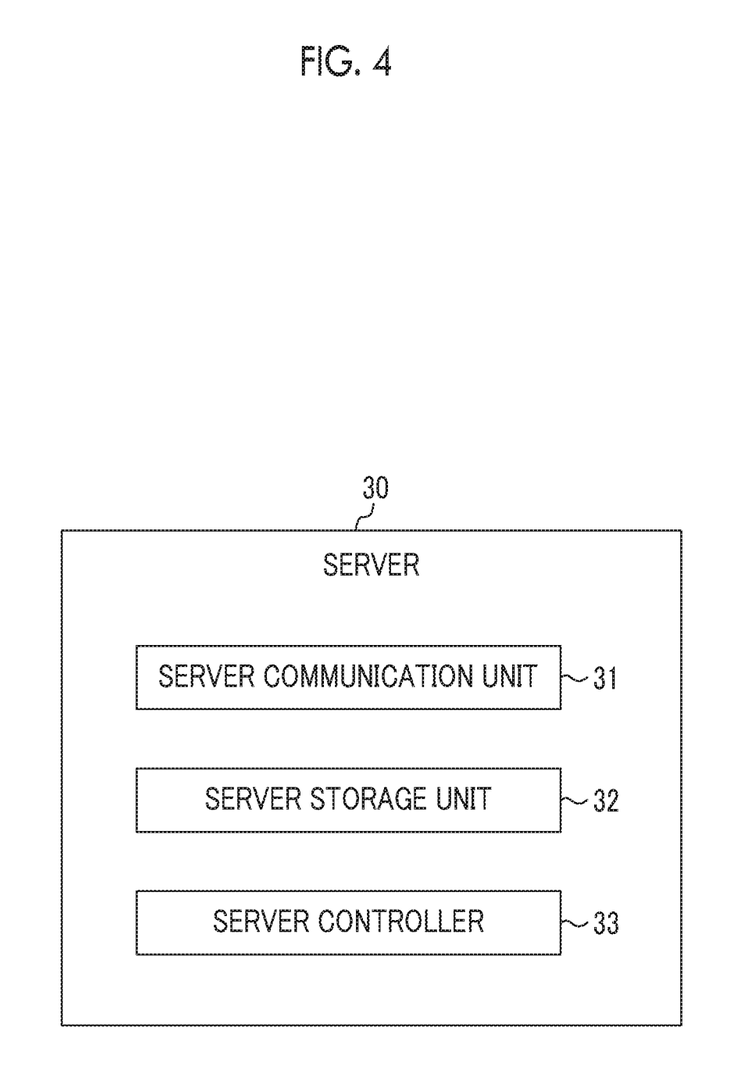
FIG. 4 is a block diagram showing the schematic configuration of a server.

As shown in FIG. 4, the server 30 includes a server communication unit 31, a server storage unit 32, and a server controller 33.

The server communication unit 31 includes a communication module that is connected to the network 40. For example, the server communication unit 31 may include a communication module corresponding to a wired local area network (LAN) standard. In the embodiment, the server 30 is connected to the network 40 through the server communication unit 31.

The server storage unit 32 includes one or more memories. Each memory included in the server storage unit 32 may function as, for example, a main storage device, an auxiliary storage device, or a cache memory. The server storage unit 32 stores optional information that is used for the operation of the server 30. For example, the server storage unit 32 may store a system program, an application program, map information, traffic information, schedule information of public transportation means, such as a bus and a train, a management database described below, and the like. Information stored in the server storage unit 32 may be updated with, for example, information to be acquired from the network 40 through the server communication unit 31.

Figure 5:
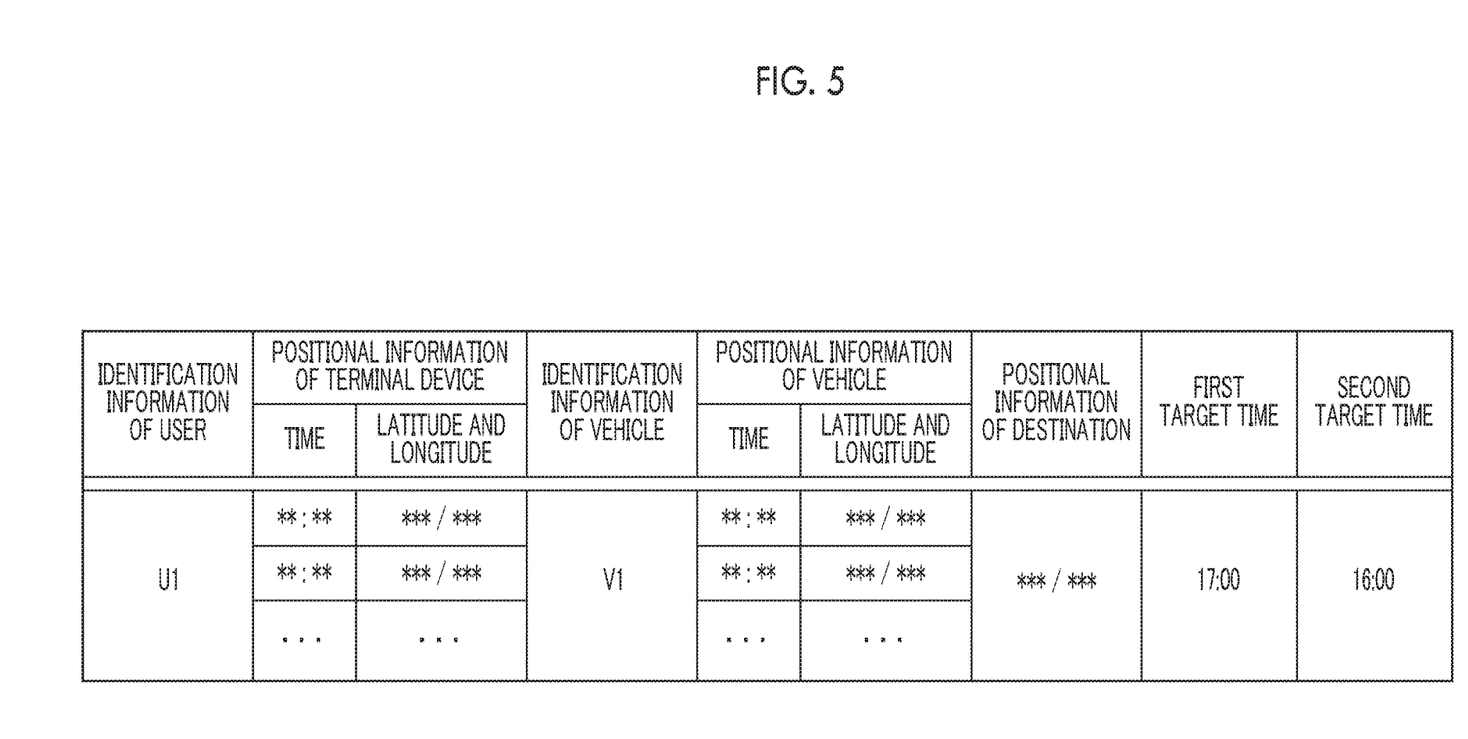
FIG. 5 is a diagram showing an example of a management database that is stored in the server.

The management database includes, for example, as shown in FIG. 5, includes the identification information of the user, the positional information of the terminal device 20, the identification information of the vehicle 10, the positional information of the vehicle 10, the positional information of the destination, the first target time, and the second target time.

The identification information of the user and the positional information of the terminal device 20 are information notified from the terminal device 20 of the user as described above. For example, the positional information of the terminal device 20 notified to the server 30 may be stored in the management database as a latitude and a longitude associated with a time when the positional information is acquired in the terminal device 20 or a time when the positional information is notified from the terminal device 20.

The identification information of the vehicle 10 is stored in the management database in association with the identification information of the user who uses the vehicle 10. The association of the identification information of the user with the identification information of the vehicle 10 to be used by the user can be executed by any method. For example, the identification information of the user may be input to the driving assistance device 12 of the vehicle 10 by the user and may be notified from the vehicle 10 to the server 30 along with the identification information of the vehicle 10. Alternatively, the identification information of the vehicle 10 may be input to the terminal device 20 by the user and may be notified from the terminal device 20 to the server 30 along with the identification information of the user. Alternatively, the identification information of the vehicle 10 and the identification information of the user who applies for the use of the vehicle 10 may be notified from an external server to be managed by the service provider of car rental or car sharing to the server 30.

The positional information of the vehicle 10 or the like is information notified from the vehicle 10 as described above. For example, the positional information of the vehicle 10 notified to the server 30 may be stored in the management database as a latitude and a longitude associated with a time when the positional information is acquired in the driving assistance device 12 or a time when the positional information is notified from the vehicle 10.

The positional information of the destination is, for example, positional information of the point C that is the return location of the vehicle 10. For example, the positional information of the destination may be input to the driving assistance device 12 or the terminal device 20 by the user and may be notified from the vehicle 10 or the terminal device 20 to the server 30. Alternatively, the positional information of the destination may be notified from the external server to be managed by the service provider to the server 30.

The first target time is a time when the user should arrive at the destination using the vehicle 10. For example, a time (for example, 17:00) as the return time limit of the vehicle 10 may be decided to the first target time. The second target time is a time (for example, 16:00) traced back from the first target time by a predetermined extension time (for example, one hour). The extension time may be decided in advance or may be set by the user. Alternatively, the extension time may be decided to zero. For example, the first target time and the second target time may be input to the driving assistance device 12 or the terminal device 20 by the user and may be notified from the vehicle 10 or the terminal device 20 to the server 30. Alternatively, the first target time and the second target time may be notified from the external server to be managed by the service provider to the server 30.

The server controller 33 shown in FIG. 4 includes one or more processors. The server controller 33 controls the overall operation of the server 30.

For example, the server controller 33 receives information notified from the vehicle 10 and the terminal device 20 as described above through the server communication unit 31. Specifically, the server controller 33 receives the identification information of the vehicle 10 and the positional information of the vehicle 10 from the vehicle 10. The server controller 33 receives the identification information of the user, and the positional information and the sensor information of the terminal device 20 from the terminal device 20. Here, the server controller 33 can recognize the correspondence relationship between the vehicle 10 and the user based on the management database.

The server controller 33 estimates the current transportation means of the user. For example, walk, bicycle, passenger car, bus, train, or the like may be estimated as the current transportation means of the user. In the estimation of the transportation means, any algorithm can be employed.

For example, the server controller 33 may calculate a current or latest moving speed of the user based on the positional information of the terminal device 20 stored in the management database and may estimate the current transportation means of the user based on the moving speed. For example, transportation means, such as "walk", "bicycle", "bus", or "train", may be estimated according to the calculated moving speed.

Alternatively, the server controller 33 may estimate the current transportation means of the user based on at least one of the sensor information of the terminal device 20, the map information, the traffic information, and the schedule information of the public transportation means in addition to the positional information of the terminal device 20. For example, determination can be made whether or not the user is positioned inside a shielded space (for example, a train) or whether or not a motor or an electric wire exists around the user based on a detection value of the magnetic sensor. In an example, when estimation is made that the user is moving using a train based on the positional information of the terminal device 20 and detection values of the acceleration sensor and the magnetic sensor, and when the position of the terminal device 20 is on a route of the train and a moving direction of the user to be estimated based on the positional information of the terminal device 20 stored in the management database conforms to the route, the server controller 33 can estimate that the user is moving on the route using a train. The server controller 33 can specify the train that the user is getting in based on schedule information of the route.

Accordingly, the estimation accuracy of the transportation means can be improved compared with estimation based on solely the positional information of the terminal device 20.

The server controller 33 decides information relating to the first route, along which the user moves to the parked vehicle 10, through multi-modal route search. The multi-modal route search is executed, for example, using the positional information of the terminal device 20, the estimated current transportation means of the user, the positional information of the vehicle 10, the map information, the traffic information, the schedule information of the public transportation means, and the like, but may be executed by any algorithm. Information relating to the first route may include, for example, information indicating the first route on a map, one or more transportation means included in information relating to the first route, and a start time and an end time of movement using each transportation means. Hereinafter, an end time of movement using the last transportation means included in information relating to the first route, that is, a time when the user is predicted to arrive at the vehicle 10 along the first route is referred to as a first predicted arrival time.

Here, the server controller 33 decides information relating to the first route such that initial transportation means among one or more transportation means included in information relating to the first route becomes the current transportation means of the user estimated as described above. Accordingly, information relating to the first route is different depending on the estimated current transportation means of the user.

Figure 6:
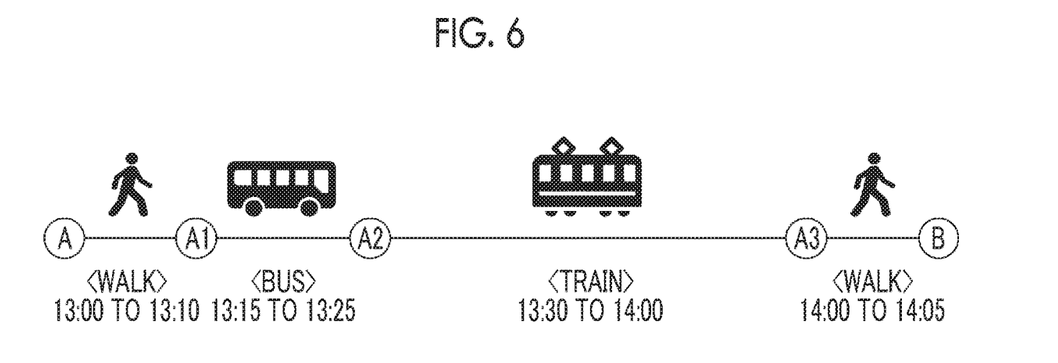
FIG. 6 is a diagram showing a first example of a route along which a user moves to a vehicle.

For example, FIG. 6 shows an example of information relating to the first route from the point A to the point B decided when the current transportation means of the user is estimated to be "walk". As shown in FIG. 6, the initial transportation means included in information relating to the first route, that is, transportation means in a section from the point A to a point A1 is "walk". Then, transportation means in a section from the point A1 to a point A2, a section from the point A2 to a point A3, and a section from the point A3 to the point B are "bus", "train", and "walk", respectively. According to the first route, the user can depart from the point A at 13:00 and can arrive at the point B at 14:05.

Figure 7:
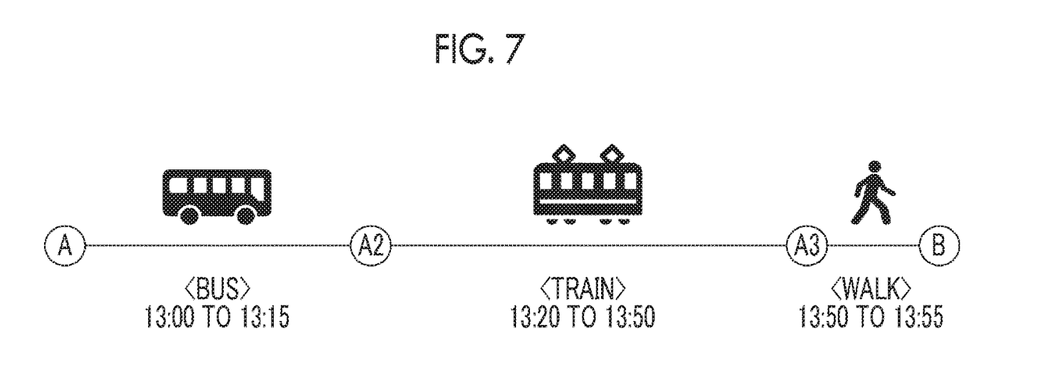
FIG. 7 is a diagram showing a second example of a route along which the user moves to the vehicle.

FIG. 7 shows an example of information relating to the first route from the point A to the point B decided when the current transportation means of the user is estimated to be "bus". As shown in FIG. 7, the initial transportation means included in information relating to the first route, that is, transportation means in a section from the point A to the point A2 is "bus". Then, transportation means in the section from the point A2 to the point A3 and the section from the point A3 to the point B are "train" and "walk", respectively. According to the first route, the user can depart from the point A at 13:00 and can arrive at the point B at 13:55.

When information relating to the first route is decided, the server controller 33 decides information relating to the second route, along which the user who has moved to the parked vehicle 10 moves to the destination using a vehicle, through vehicle route search. The vehicle route search is executed, for example, using the first predicted arrival time when the user arrives at the vehicle 10 along the first route, the positional information of the vehicle 10, the positional information of the destination, the map information, the traffic information, and the like, but may be executed by any algorithm. Information relating to the second route may include, for example, information indicating the second route on the map, a movement start time when the user starts to move, and a second predicted arrival time when the user arrives at the destination. The movement start time is decided based on the above-described first predicted arrival time. Here, when the second route includes one or more via-points, information relating to the second route may further include a predicted time when the user arrives at each via-point, and a departure time when the user departs from each via-point.

When information relating to the second route is decided, the server controller 33 transmits the first guide information for prompting the user to start moving along the first route to the terminal device 20 through the server communication unit 31 based on comparison of the second predicted arrival time of the destination with the second target time included in the management database stored in the server storage unit 32. Specifically, the server controller 33 determines whether or not the second predicted arrival time satisfies a condition of being after the second target time. When the server controller 33 determines that the second predicted arrival time does not satisfy the condition, the server controller 33 does not transmit the first guide information. When the server controller 33 determines that the second predicted arrival time satisfies the condition, the server controller 33 transmits the first guide information to the terminal device 20.

When getting-in of the user is notified from the vehicle 10 as described above, the server controller 33 transmits the second guide information for prompting the user to start moving along the second route to the vehicle 10 through the server communication unit 31.

Operation Flow of Information Processing System

Figure 8:
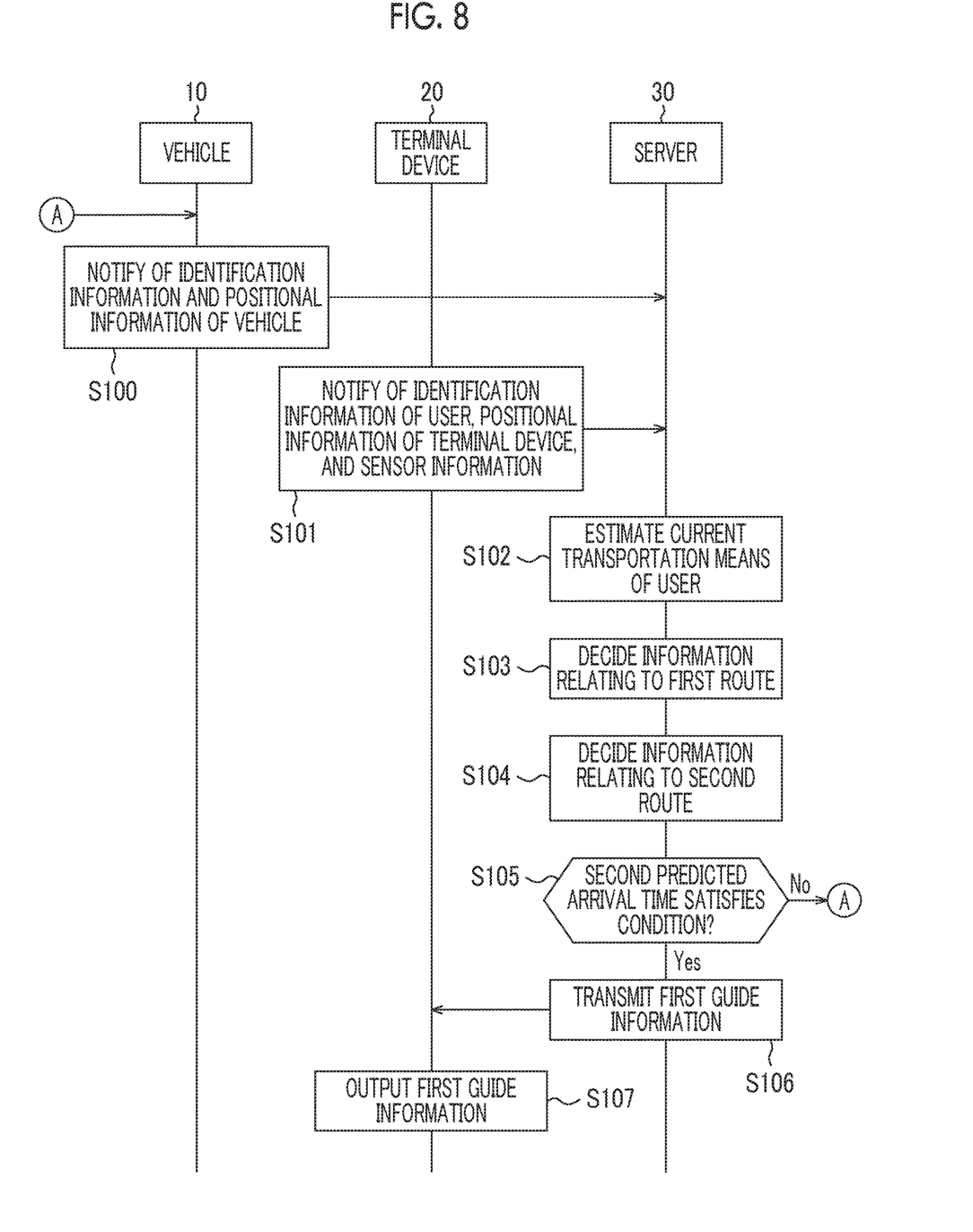
FIG. 8 is a sequence diagram showing a first operation of the information processing system.

A flow of a first operation of the information processing system 1 will be described referring to FIG. 8. As described above, the first operation is an example of an operation until the first guide information for prompting the user to start moving along the first route is output.

Step S100: The vehicle 10 notifies the server 30 of the identification information and the positional information of the vehicle 10.

Step S101: The terminal device 20 notifies the server 30 of the identification information of the user, and the positional information and the sensor information of the terminal device 20.

Step S102: The server 30 estimates the current transportation means of the user based on the positional information of the terminal device 20, and the like.

Step S103: The server 30 decides information relating to the first route, along which the user moves to the parked vehicle 10, based on the positional information of the terminal device 20, the current transportation means of the user, the positional information of the vehicle 10, and the like through the multi-modal route search.

Step S104: The server 30 decides information relating to the second route, along which the user who has moved to the vehicle 10 moves to the destination using the vehicle 10, based on the positional information of the vehicle 10, the positional information of the destination, and the like through the vehicle route search.

Step S105: The server 30 determines whether or not the second predicted arrival time of the destination included in information relating to the second route satisfies a condition of being after the second target time included in the management database. When the server 30 determines that the second predicted arrival time does not satisfy the condition (that is, the second predicted arrival time is before the second target time) (Step S105: No), the process returns to Step S100. When the server 30 determines that the second predicted arrival time satisfies the condition (that is, the second predicted arrival time is after the second target time) (Step S105: Yes), the process progresses to Step S106.

Step S106: The server 30 transmits the first guide information for prompting the user to start moving along the first route to the terminal device 20.

Step S107: The terminal device 20 outputs the first guide information in a form of a video or a sound.

Figure 9:
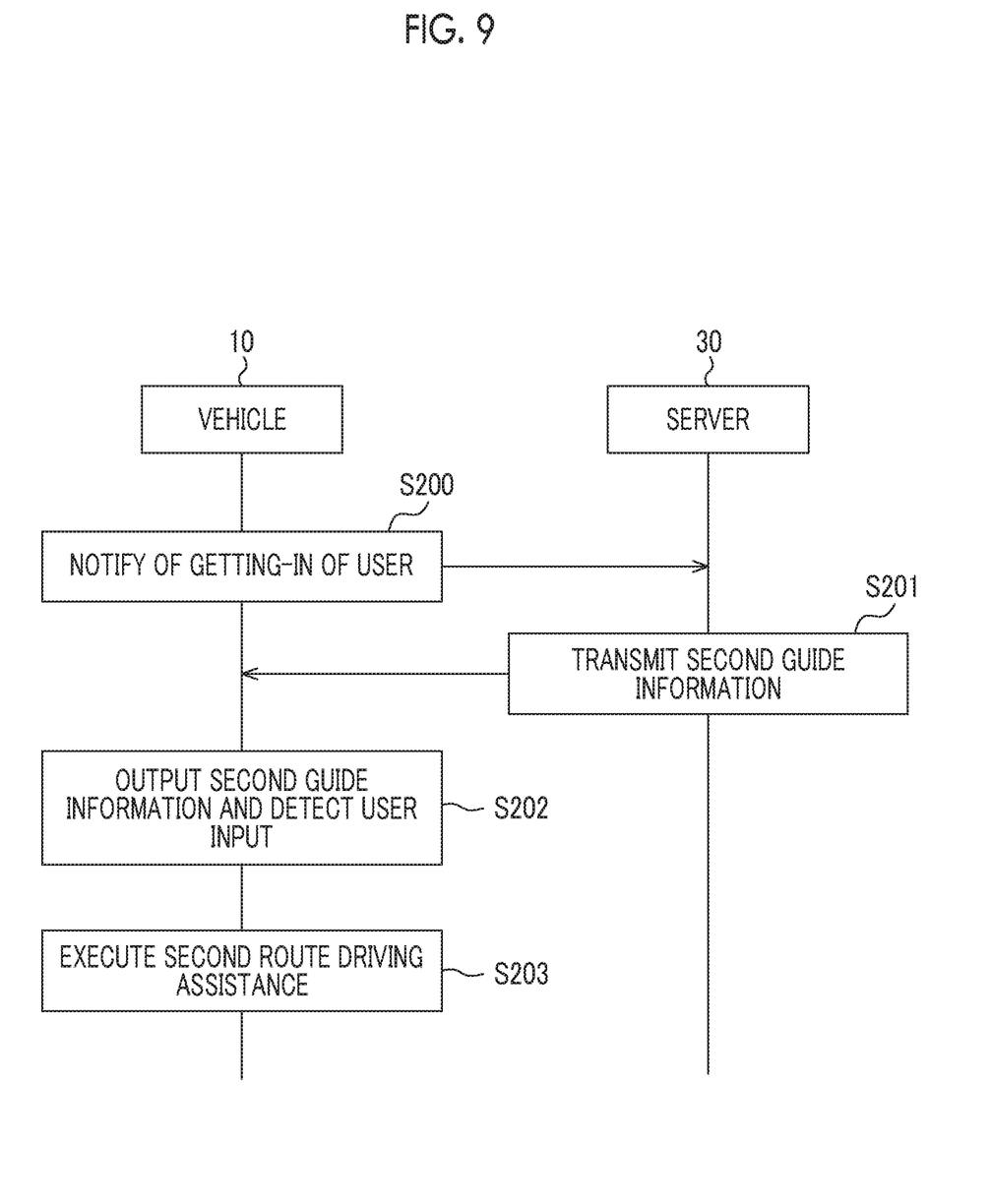
FIG. 9 is a sequence diagram showing a second operation of the information processing system.

A flow of a second operation of the information processing system 1 will be described referring to FIG. 9. As described above, the second operation is an example of an operation after the user moves to the parked vehicle 10.

Step S200: When the user gets in the vehicle 10, the vehicle 10 notifies the server 30 of getting-in of the user.

Step S201: The server 30 transmits the second guide information for prompting the user to start moving along the second route to the vehicle 10.

Step S202: The vehicle 10 outputs the second guide information in a form of a video or a sound and waits for a user input for executing the driving assistance. When the user input is detected, the process progresses to Step S203.

Step S203: The vehicle 10 executes the driving assistance to move to the destination along the second route.

As described above, with the information processing system 1 according to the embodiment, the first guide information for prompting the user to start moving along the first route is output on the terminal device 20 in a form of a video or a sound. For this reason, a probability that the user can arrive at the destination using the vehicle 10 until the first target time is improved. The first route is decided based on the estimated current transportation means of the user. For this reason, for example, a probability that an inappropriate first route having the initial transportation means to be transportation means other than "bus" is decided even though the user is moving using a bus, and as a result, the accuracy of the first predicted arrival time and the second predicted arrival time is degraded is reduced. In other words, since an appropriate first route is decided according to the current transportation means of the user, the accuracy of the first predicted arrival time and the second predicted arrival time is improved, and as a result, a probability that the user can arrive at the destination using the vehicle 10 until the first target time is further improved. Accordingly, convenience of a user support technique relating to a traveling schedule of the vehicle 10 is improved.

Although the disclosure has been described based on the drawings and the example, it should be noted that those skilled in the art can easily make various modifications and corrections based on the present disclosure. Accordingly, it should be noted that such modifications and corrections are included in the scope of the disclosure. For example, the functions and the like included in respective means or respective steps can be rearranged as long as there is no logical contradiction, and two or more means or steps may be combined into single means or step or may be divided.

For example, in the above-described embodiment, a configuration in which the server 30 estimates the current transportation means of the user has been described. However, for example, a configuration in which the terminal device 20 estimates the current transportation means of the user may be made. In such a case, the terminal device 20 notifies the server 30 of the estimated current transportation means of the user in place of the sensor information of the terminal device 20.

In the above-described embodiment, a configuration in which the information processing system 1 includes the server 30 has been described. However, a configuration in which the information processing system 1 does not include the server 30 may be made. In such a case, for example, the terminal device 20 may execute the same operation as the server 30.

In the above-described embodiment, the first route along which the user moves to the parked vehicle 10 may be decided so as to include a predetermined via-point. The via-point may be optionally set by the user, for example. Alternatively, the via-point may be automatically set. For example, when the terminal device 20 detects that the user deposits a package in a coin-operated locker based on the positional information of the terminal device 20, a payment history, and the like, the terminal device 20 notifies the server 30 of positional information of the coin-operated locker. The server 30 decides information relating to the first route so as to include the notified position of the coin-operated locker as a via-point.

In the above-described embodiment, a configuration in which the return location of the vehicle 10 is set to the destination of the second route has been described. However, the destination of the second route may be optionally set by the user. For example, the vehicle 10 or the terminal device 20 may set the destination of the second route, the first target time, and the second target time based on a user input. In such a case, the vehicle 10 or the terminal device 20 notifies the server 30 of the set information.

In the above-described embodiment, a configuration in which the server 30 transmits the first guide information for prompting the user to start moving along the first route to the terminal device 20 has been described. Here, when the estimated current transportation means of the user is the vehicle 10 (that is, when the user is getting in the vehicle 10), the server 30 may transmit the second guide information for prompting the user to start moving along the second route to the vehicle 10 instead of transmitting the first guide information to the terminal device 20.

A configuration in which, for example, a general-purpose electronic apparatus, such as a mobile phone, a smartphone, a tablet terminal, or a mobile computer, functions as the driving assistance device 12 or the terminal device 20 according to the above-described embodiment may be made. Specifically, a program in which processing contents for implementing the functions of the driving assistance device 12 or the terminal device 20 according to the embodiment are described is stored in a memory of the electronic apparatus, and the program is read and executed on a processor of the electronic apparatus. Accordingly, the embodiment can also be implemented as a program to be executable by the processor.

What is claimed is:

1. An information processing system comprising:
   a vehicle to be used by a user, the vehicle being configured to acquire positional information of the vehicle;
   a terminal device to be used by the user, the terminal device being configured to acquire positional information of the terminal device; and
   a server configured to be able to perform communication with the vehicle and the terminal device, wherein:
   the terminal device or the server estimates current transportation means of the user based on the positional information of the terminal device;
   the server decides information relating to a first route, along which the user moves to the vehicle, based on the positional information of the terminal device, the estimated current transportation means of the user, and the positional information of the vehicle;
   the server decides information relating to a second route, along which the user who has moved to the vehicle moves to a predetermined destination using the vehicle, based on a first predicted arrival time at which the user arrives at the vehicle along the first route, the positional information of the vehicle, and positional information of the predetermined destination;

the server transmits first guide information for prompting the user to start moving along the first route to the terminal device based on comparison of a second predicted arrival time, at which the user arrives at the predetermined destination along the second route, with a predetermined time; and when the first guide information is received, the terminal device outputs the first guide information in a form of video or sound.

2. The information processing system according to claim 1, wherein the first guide information includes the information relating to the first route.

3. The information processing system according to claim 1, wherein the server decides the information relating to the first route such that initial transportation means among one or more transportation means included in the information relating to the first route becomes the estimated current transportation means of the user.

4. The information processing system according to claim 1, wherein the server estimates the current transportation means of the user based on the positional information of the terminal device and sensor information of a sensor unit mounted in the terminal device.

5. The information processing system according to claim 1, wherein:

when the estimated current transportation means of the user is not the vehicle, the server transmits the first guide information to the terminal device based on comparison of the second predicted arrival time with the predetermined time;

when the estimated current transportation means of the user is the vehicle, the server transmits second guide information for prompting the user to start moving along the second route to the vehicle based on comparison of the second predicted arrival time with the predetermined time; and when the second guide information is received, the vehicle outputs the second guide information in a form of a video or a sound.

6. A server comprising:

a server communication unit configured to be able to perform communication with a vehicle and a terminal device which are to be used by a user; and a server controller, wherein:

the server controller receives positional information of the vehicle and positional information of the terminal device through the server communication unit, and decides information relating to a first route, along which the user moves to the vehicle, based on the positional information of the terminal device, current transportation means of the user estimated based on the positional information of the terminal device, and the positional information of the vehicle;

the server controller decides information relating to a second route, along which the user who has moved to the vehicle moves to a predetermined destination using the vehicle, based on a first predicted arrival time at which the user arrives at the vehicle along the first route, the positional information of the vehicle, and positional information of the predetermined destination; and the server controller transmits guide information for prompting the user to start moving along the first route to the terminal device based on comparison of a second predicted arrival time, at which the user arrives at the predetermined destination along the second route, with a predetermined time.

\* \* \* \* \*